(12) United States Patent
Aho

(10) Patent No.: US 6,885,870 B2
(45) Date of Patent: Apr. 26, 2005

(54) TRANSFERRING OF A MESSAGE

(75) Inventor: Outi Aho, Lempäälä (FI)

(73) Assignee: Nokia Mobile Phones, Ltd., Espoo (FI)

( * ) Notice: Subject to any disclaimer, the term of this patent is extended or adjusted under 35 U.S.C. 154(b) by 849 days.

(21) Appl. No.: 09/745,756

(22) Filed: Feb. 22, 2001

(65) Prior Publication Data

US 2001/0005675 A1 Jun. 28, 2001

(30) Foreign Application Priority Data

Dec. 23, 1999 (FI) .............................................. 19992783

(51) Int. Cl.[7] .............................................. H04Q 7/20
(52) U.S. Cl. ................. 455/466; 455/432.3; 455/432.1; 370/353; 370/395.1
(58) Field of Search ................................ 455/509, 510, 455/515, 466, 552.1, 556.1, 557; 370/352, 353, 395.1, 395.2

(56) References Cited

U.S. PATENT DOCUMENTS 5,878,347 A 3/1999 Joensuu et al. ............. 455/433
5,920,820 A 7/1999 Qureshi et al. ............. 455/461

FOREIGN PATENT DOCUMENTS

| WO | WO 99/61966 | 12/1999 |
| WO | WO 00/38438 | 6/2000 |

Primary Examiner—Temica M. Beamer
(74) Attorney, Agent, or Firm—Perman & Green, LLP

(57) ABSTRACT

A method is provided for inquiring about information relating to a mobile terminal of a cellular network, from a messaging server external to the cellular network. An inquiry is sent from the messaging server to the cellular network, comprising an external first identifier for identifying said terminal. In the cellular network the first identifier is mapped to a second internal identifier. The information relating to the terminal (MS) is determined with the aid of said second identifier and a responsive message is sent from the cellular network to said messaging server. In the response message, said information relating to the terminal is indicated by the first identifier.

19 Claims, 4 Drawing Sheets ially in a
TRANSFERRING OF A MESSAGE

FIELD OF THE INVENTION

The present invention relates to a messaging service. In particular, but not necessarily, the invention relates to the store-and-forward messaging of multimedia messages in a wireless telecommunication system.

BACKGROUND OF THE INVENTION

Wireless communication networks and the Internet network are expanding rapidly and their number of users is increasing. The GPRS (General Packet Radio Service) of the GSM (Global System for Mobile Communications) provides means for transferring information in packet switched mode in a cellular radio network. GPRS also provides an interface to other packet switched networks, such as the Internet network.

FIG. 1 shows the interconnections of a telecommunication network in a packet switched GPRS service. The main element of the network's infrastructure for providing GPRS services is a GPRS support node. GPRS support nodes are categorised into Serving GPRS Support Nodes SGSN which, in packet switched data transmission correspond to the Mobile Switching Centers MSC of the GSM network, known in connection with circuit switched data transmission, and Gateway GPRS Support Nodes GGSN. An SGSN is a support node that transmits data packets to a wireless terminal MS (Mobile Station) and receives data packets transmitted by a wireless terminal through a Base Station System BSS, comprising base transceiver stations BTS and base station controllers BSC. In this description, the term wireless terminal MS is used to mean all terminals that communicate over a specific radio interface. Thus, a computer terminal that communicates through a mobile station attached thereto will also be referred to as a wireless terminal. The SGSN also maintains information on the location of the wireless terminals that move in its service area in GPRS registers (not shown in FIG. 1). Physically, the SGSN is typically implemented as a separate network element. The GGSN that communicates with the SGSN provides a connection to and enables co-operation with other networks. Such networks can be, among others, another operator's GPRS (cellular) network or a private network such as, for example, a company's Intranet network, a public switched packet data network PSPDN such as, for example, the Internet network or an X.25 network.

For a long time, the user of a computer terminal in communication with the Internet network has had the opportunity to retrieve multimedia components, such as pictures, text, short video clips and audio clips in electronic format, into his computer terminal from a server of the Internet network. As data transfer rates increase and the properties of mobile stations improve, an interest in a multimedia messaging service and messaging services in general has now also been awakened in wireless networks. As networks that support packet switched data transmission, the GPRS network and $3^{rd}$ generation mobile communication networks, such as CDMA2000 (Code Division Multiple Access) and WCDMA (Wideband CDMA) in particular, are very well suited for the implementation of a multimedia messaging service.

A multimedia messaging service for $3^{rd}$ generation mobile communication networks has been proposed which would be implemented in a manner similar to the Short Message Service SMS in a GSM network, i.e. substantially in a store-and-forward manner by transferring messages addressed to a wireless terminal, stored in a specific messaging server, to the wireless terminal when it can be contacted. Said messaging server would preferably be located outside the cellular network in question, for example, in the Internet network.

In the following, a GPRS network will be examined. In the GPRS service of the GSM network, a wireless terminal "attached" to the GPRS network can transmit and receive short messages. The wireless terminal can transmit and receive data in packet switched mode if it is attached to the GPRS network and, in addition, it has an active PDP-context (PDP=Packet Data Protocol) with some GGSN. Activation of a PDP-context may be effected either at the request of the wireless terminal or the network.

It is expedient for the messaging server to make specific inquiries to the GPRS network from time to time. For example, on receiving a message addressed to a given wireless terminal, it is expedient for the messaging server to make sure, by making an inquiry, that the wireless terminal in question is actually ready to receive the message (i.e. it has an active PDP-context with some GGSN), before transmitting the message to the GPRS network. In cellular networks, dynamic PDP addresses (such as dynamic IP addresses, Internet Protocol) are often allocated to terminals. In this case, a wireless terminal does not necessarily always have use of the same PDP address, but when a wireless terminal requests a PDP address, the network gives it a PDP address, which may be the same PDP address the wireless terminal had on a previous occassion, or some other PDP address, depending on what PDP addresses the network has free at that time for the use of wireless terminals.

When using dynamic IP addresses there is a problem associated with performing the previously mentioned inquiry to identify said wireless terminal from outside the cellular network (GPRS network): How can a wireless terminal be identified from outside a cellular network so that inquiries relating to the wireless terminal can also be carried out reliably when the wireless terminal has a dynamic PDP address?

SUMMARY OF THE INVENTION

Now, a new solution has been invented relating to the identification of a wireless terminal. According to a first aspect of the invention, there is provided a method for inquiring about information relating to a terminal of a cellular network from the cellular network, from a messaging server external to the cellular network.

The method is characterised in that it comprises:

sending an inquiry from the messaging server to the cellular network to determine said information relating to the wireless terminal, the inquiry comprising a first identifier for identifying said terminal, the first identifier being a specific identifier external to the cellular network;

mapping said first identifier to a specific second identifier in the cellular network, the second identifier being an internal identifier of the cellular network;

determining said information relating to the terminal with the aid of said second identifier;

sending a response message in response to said inquiry from the cellular network to said messaging server external to the cellular network, in which response message said information relating to the terminal is indicated with the aid of said first identifier.

According to a second aspect of the invention, there is provided a server external to a cellular network for inquiring about specific information relating to a terminal of the cellular network from the cellular network The server is characterised in that it server comprises:

means for defining a specific first identifier external to the cellular network for identifying said terminal;

means for sending an inquiry from the server to the cellular network to determine said information relating to the terminal, the inquiry comprising said first identifier.

According to a third aspect of the invention, there is provided a computer program product executable in a server external to a cellular network for inquiring about specific information relating to a terminal of the cellular network from the cellular network.

The computer program product is characterised in that it comprises program code:

for defining a specific first identifier external to the cellular network for identifying said terminal;

for causing said server to send an inquiry to the cellular network to determine said information relating to the terminal, the inquiry comprising said first identifier for identifying said terminal.

According to a fourth aspect of the invention, there is provided a network element of a cellular network.

The network element is characterise in that it comprises:

means for receiving a specific inquiry sent by a server external to the cellular network, the inquiry comprising a request to determine specific information relating to a terminal of the cellular network, and the inquiry comprising a first identifier for identifying said terminal, the first identifier being a specific identifier external the cellular network;

means for mapping said first identifier to a specific second identifier, the second identifier being an internal identifier of the cellular network;

means for determining said information relating to the terminal with the aid of said second identifier;

means for sending a response message to the server external to the cellular network in response to said inquiry, the response message comprising the information relating to said terminal indicated with the aid of said first identifier.

According to a fifth aspect of the invention, there is provided a computer program product executable in a network element of a cellular network.

The computer program product is characterised in that it comprises program code:

for causing the network element to receive a specific inquiry sent by a server external to the cellular network, the inquiry comprising a request to determine specific information relating to a terminal of the cellular network, and the inquiry comprising a first identifier for identifying said terminal, the first identifier being a specific identifier external to the cellular network;

for mapping said first identifier to a specific second identifier, the second identifier being an internal identifier of the cellular network;

for causing the network element to determine said information relating to the terminal with the aid of said second identifier;

for causing the network element to send a response message to the server external to the cellular network in response to said inquiry, the response message comprising the information relating to said terminal indicated with the aid of said first identifier.

According to a sixth aspect of the invention, there is provided a system, comprising a server external to a cellular network and a network element of the cellular network for inquiring about information relating to a terminal of the cellular network from the cellular network, from the server external to the cellular network.

The system is characterised in that the server comprises:

means for defining a specific first identifier external to the cellular network for identifying said terminal;

means for sending an inquiry from the server to the network element of the cellular network to determine said information relating to the terminal, the inquiry comprising said first identifier, and that the network element of the cellular network comprises:

means for receiving said inquiry;

means for mapping said first identifier to a specific second identifier, the second identifier being an internal identifier of the cellular network;

means for determining said information relating to the terminal with the aid of said second identifier;

means for sending a response message to the server external to the cellular network in response to said inquiry, the response message comprising the information relating to said terminal indicated with the aid of said first identifier.

In this description, the terminal can be any wireless terminal that can be attached to a GPRS network or a $3^{rd}$ generation network, for example, a mobile station of a cellular network or a computer terminal attached to a GPRS network (e.g. through a telephone of a cellular network). In connection with the present application, the concept of a cellular network should be interpreted broadly, whereupon the concept of a cellular network is also considered to cover, for example, the GPRS service of a GSM network and the network elements of the core network of a $3^{rd}$ generation network. In a preferred embodiment of the invention, said server is a messaging server, even more preferably a multimedia messaging server, located outside the cellular network in a packet data network, such as the Intranet network of an operator, the Internet network or an X.25 network.

In a preferred embodiment of the invention, said inquiry sent from the server to the cellular network to inquire about information relating to the terminal of the cellular network is addressed to a specific network element of a GPRS network, to a GGSN, which determines said information relating to the terminal of the cellular network, which can be, e.g. whether the terminal is attached to the GPRS network or whether the terminal is ready to receive data, and indicates it to said server external to the cellular network.

A specific first identifier external to the cellular network is used to identify the terminal between the server and the cellular network which, in connection with a preferred embodiment of the invention, is called an MMS-ID. Said first identifier is mapped to a specific second identifier in the cellular network. Said second identifier, which is an internal identifier of the cellular network and which can be, for example, the terminal's IMSI (International Mobile Subscriber Identity) code or an equivalent, is used to identify the terminal inside the cellular network and it is not revealed to network elements external to the cellular network.

BRIEF DESCRIPTION OF THE DRAWINGS

In the following, the invention will be described in detail with reference to the accompanying drawings, in which.

DETAILED DESCRIPTION

Figure 1:
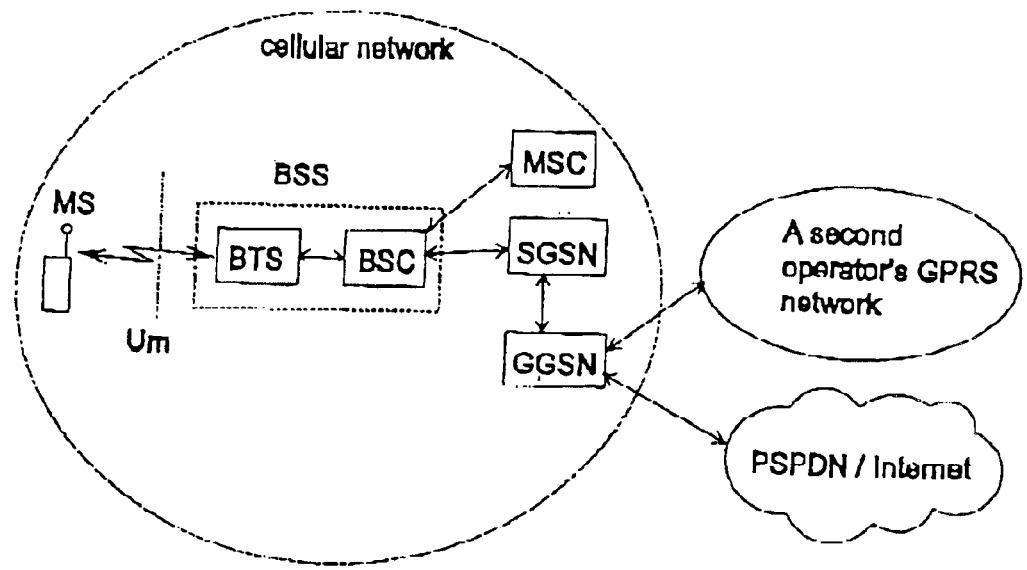
FIG. 1 shows the interconnections of a telecommunication network in a packet switched GPRS service.

FIG. 1 was described above in connection with the description of prior art.

Figure 2:
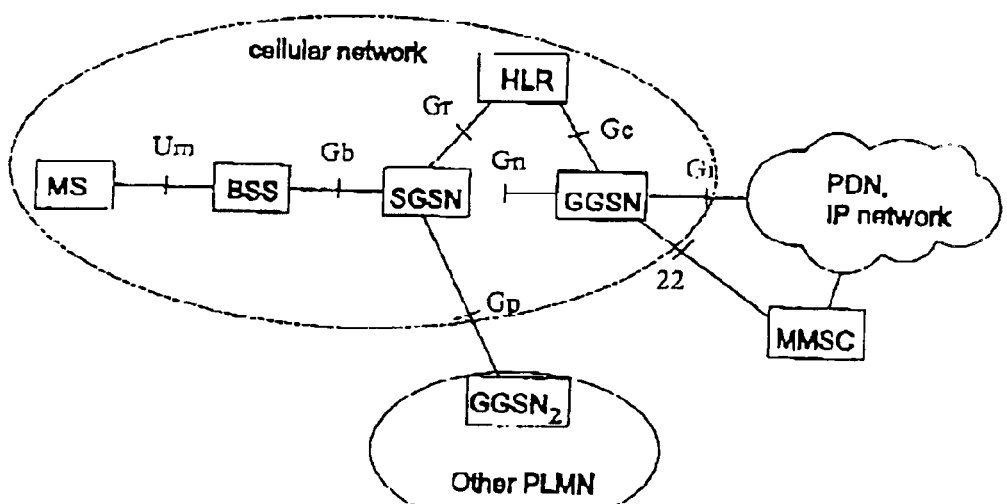
FIG. 2 illustrates an arrangement for implementing message transmission according to the invention.

FIG. 2 illustrates an arrangement according to a first preferred embodiment of the invention for implementing message transmission between a wireless terminal MS that supports GPRS and a messaging server. FIG. 2 shows a wireless terminal MS, a Base Station System BSS, a Serving GPRS Support Node SGSN, and a Gateway GPRS Support Node GGSN, a Gateway GPRS Support Node $GGSN_2$ located in the mobile communication network PLMN (Public Land Mobile Network) of a second operator, a Packet Data Network PDN, which in a preferred embodiment of the invention is an IP network, a messaging server that is in communication with the IP network which, in a first preferred embodiment of the invention is a Multimedia Messaging Service Centre MMSC, and a Home Location Register HLR that contains the routing information and the GPRS subscription information of the wireless terminal MS. In this description, the term IP network means either an Intranet network managed by a company and/or an operator, or the open public Internet network.

FIG. 2 also shows the interfaces between different network elements: a Um interface between the wireless terminal MS and the base station system BSS, a Gb interface between the base station system BSS and the SGSN, a Gn interface between the SGSN and the GGSN, a Gi interface between the GGSN and the IP network, a Gr interface between the SGSN and the home location register HLR, a Gc interface between the GGSN and the home location register HLR, as well as a logical interface 22 according to the invention between the GGSN and the MMSC. In addition, FIG. 2 shows a logical Gp interface between the GPRS cellular networks of different operators.

Technically, the GPRS support nodes of a particular operator are connected to each other within the cellular network by the operator's internal IP network (Intra-PLMN Backbone). However, this should not be confused with the previously mentioned Intranet network, which is external to cellular network and is managed by a company and/or an operator However, said IP networks (the Intra-PLMN Backbone network and the Intranet network managed by the operator) are preferably functionally connected to each other, for example, through a gateway.

By agreement between operators, the GPRS networks of different operators are connected by a GPRS network (Inter-PLMN Backbone) between the operators. In practice, there is typically a firewall and a Border Gateway BG between the Intra-PLMN Backbone network and the Inter-PLMN Backbone network. These are not shown in FIG. 2.

Among other things, the purpose of interface 22 is to enable messaging between the MMSC and the GGSN so that the GGSN can process an inquiry coming from the MMSC and respond to it. The MMSC is located outside the cellular network, preferably in the Intranet network of an operator. Preferably the interface 22 is implemented using the same protocol as that used in the operator's Intra-PLMN Backbone network, i.e. an IP protocol. Alternatively, the interface 22 can be implemented using some other protocol of the same level.

Figure 3:
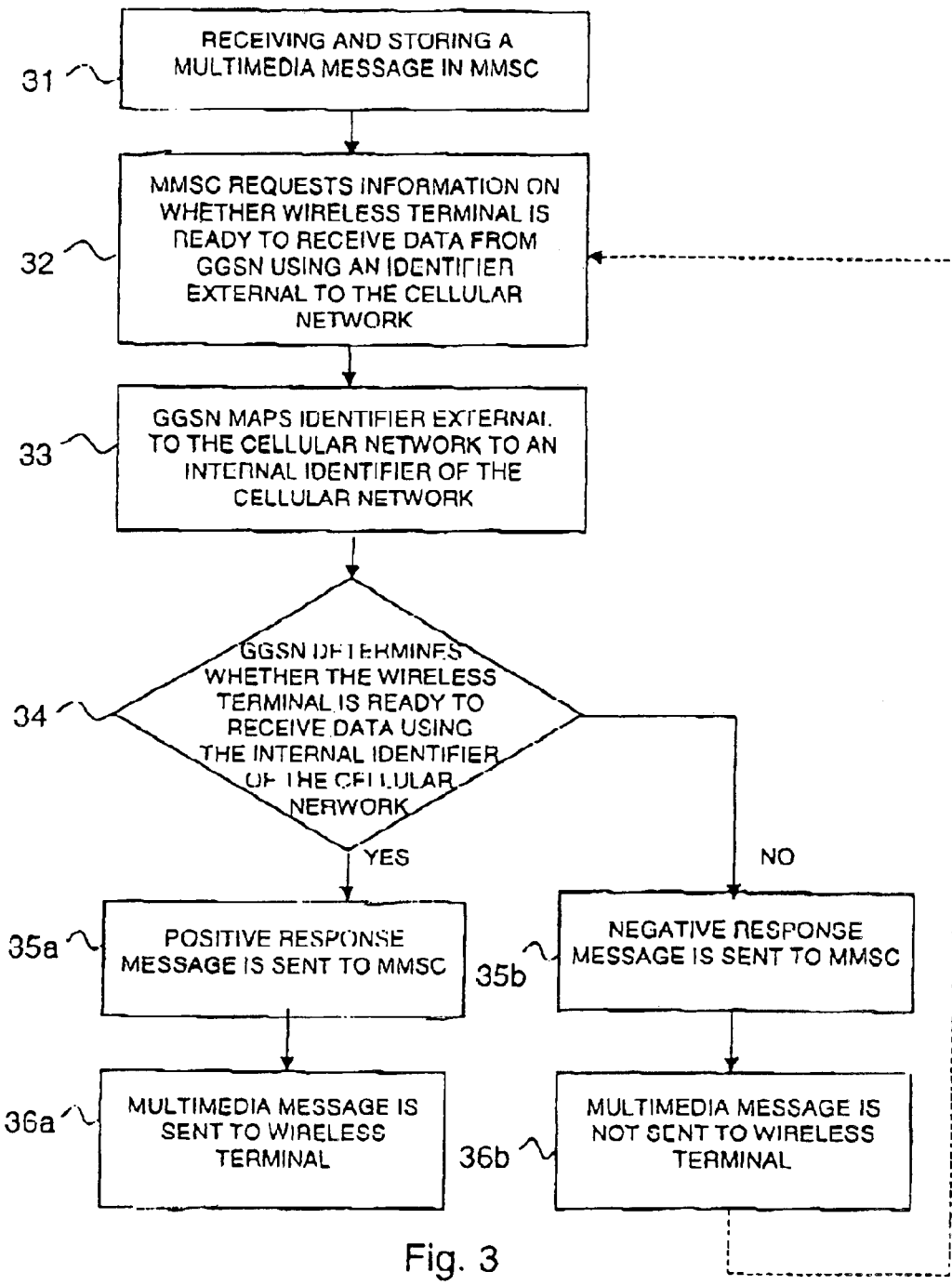
FIG. 3 is a flow diagram illustrating a method for implementing a messaging service according to the invention.

FIG. 3 is a flow diagram illustrating the general outline of a method for implementing a messaging service according to the first preferred embodiment of the invention. The method comprises determining the readiness of the wireless terminal MS to receive data, transferring information about this to an MMSC and, in the case where the wireless terminal MS is ready to receive data, transferring a multimedia message from the MMSC through the GPRS network to the wireless terminal MS.

First, a multimedia message addressed to the wireless terminal arrives at the MMSC and the MMSC stores it in its memory (block 31). Next, the MMSC sends an inquiry to the GGSN through the interface 22, i.e. a message-requesting information from the GGSN on whether the wireless terminal MS, to which the multimedia message is addressed, is ready to receive data (block 32). According to the invention, a specific identifier MMS-ID external to the cellular network, to be presented later, is used in said inquiry to identify the wireless terminal. In block 33, the GGSN maps said identifier external to the cellular network to a specific internal identifier of the cellular network (IMSI or equivalent). In block 34 the GGSN determines whether the wireless terminal MS is ready to receive data using said internal identifier of the cellular network. In the case of a GPRS network, the GGSN determines whether the wireless terminal has an active PDP-context with some GGSN. If the wireless terminal MS is ready to receive data (a PDP-context is activated with some GGSN), the GGSN sends a positive response message, again comprising said identifier external to the cellular network (block 35a), to the MMSC through the interface 22, after which transfer of the multimedia message from the MMSC to the wireless terminal MS can start (block 36a). If the wireless terminal MS is not ready to receive data (a PDP-context is not activated), the GGSN sends a negative response message comprising said identifier external to the cellular network to the MMSC through the interface 22 (block 35b), whereupon transfer of the multimedia message from the MMSC to the wireless terminal MS cannot be started at that time (36b). This being the case, the inquiry to determine the readiness of the wireless terminal MS to receive data can be repeated, for example, after a certain period of time (dashed line to block 32).

Said multimedia message may comprise a plurality of multimedia elements, such as pictures, text, short video clips and audio clips in electronic format. The address of the recipient of the multimedia message associated with the multimedia message can be, for example, the telephone number of the wireless terminal MS, the logical network address of a computer terminal attached to the GPRS network or some other address supported by GPRS. Typically, said address is in RFC822 format. RFC822 is an Internet standard that defines a format in which a logical address can be presented in a form understandable to the user. An example of an address in RFC822 format is outi.aho@mmsc1.nokia1.com. Here, "mmsc1.nokia1.com" is the logical address (so-called domain name) of the MMSC in question. The telephone number of a is wireless terminal can also be converted into RFC822 format in an IP network. URL (Uniform Resource Locator) pointers can also be attached to said multimedia message.

Typically, the MMSC always sends the inquiry related to the readiness of said wireless terminal MS to receive data to the same GGSN, which will be called a "default-GGSN"

from now on. The address of the default-GGSN (typically indicated as a logical domain name which can be, e.g. in the form ggsn1.nokia1.com) is stored in the MMSC. The MMSC is located in a packet data network. Preferably, the MMSC is located outside the GPRS cellular network in the IP network (Intranet network) of the operator that also manages said default-GGSN. Alternatively, the MMSC can be managed by an external service provider, for example, in the Internet network.

The address of the recipient of the multimedia message in plain RFC822 format, stored in the MMSC, is mapped in the MMSC to a specific identifier, external to the cellular network, which is then used as an identifier for the wireless terminal MS in communication between the default-GGSN and the MMSC. In this description, said external identifier is called an MMS-ID (Multimedia Messaging Service Identity). To perform the mapping, the MMSC comprises a specific database, in which the wireless terminal's multimedia messaging service subscription information is stored. The correspondences between the MMS-ID and the the wireless terminal's addresses in RFC822 format are also stored in said database. Said database of the MMSC is presented in connection with the description of FIG. 5.

The MMS-ID is an identifier external to the of the cellular network, a parameter or a set of parameters, which indicates the MMSC from which the wireless terminal MS in question (the owner of the terminal) has subscribed to a multimedia messaging service. The MMS-ID has a general data format, so it can be, for example, in a text format and, for example, may appear as follows:

|MMSC ID|User ID|Security ID|, where a vertical line (|) separates the different parts of the MMS-ID, which are for example, an MMSC ID, which is the identifier of the MMSC in question, a User ID, which is the identifier of the (multimedia messaging) service subscriber, and a Security ID, which can be formed in the MMSC and the default-GGSN on the basis of the MMSC ID and the User ID using a specific algorithm agreed upon in advance. The Security ID can be used in the cellular network to ensure the legitimacy of the MMSC and the subscriber.

The correspondence between the MMS-ID and the IMSI code of the wireless terminal in question, which is an identifier internal to the cellular network, is stored in the GPRS network. The database in which it is stored, can be implemented in the GPRS network, for example, by means of a DNS (Domain Name System) server. The IMSI code is used as the principal identifier of the mobile subscriber of the wireless terminal MS within the GPRS network. Typically, the IMSI code is stored in a SIM (Subscriber Identity Module) card, The SIM card is used as a subscriber identity unit in the wireless terminal MS. Thus, when the present description refers to e.g. the IMSI code of a wireless terminal, this means the IMSI code of a subscriber known to the network, stored in a SIM card or the like, installed in the wireless terminal MS. Correspondingly, when a multimedia message addressed to the wireless terminal MS is mentioned, this means a multimedia message addressed to the subscriber whose SIM card is in the wireless terminal MS, and so on.

Depending on the implementation, the database in which the correspondences between the MMS-ID and the IMSI code of the wireless terminal are stored may be located in different places in the teleoperator's GPRS network. The database should be easy for the default-GGSN to access. Said database can also be implemented in an appropriate manner by means other than a DNS server. It is also possible to integrate said database into the HLR, but preferably this is not done, as there is a desire to keep the amount of data to be stored in the HLR as small as possible.

Figure 4:
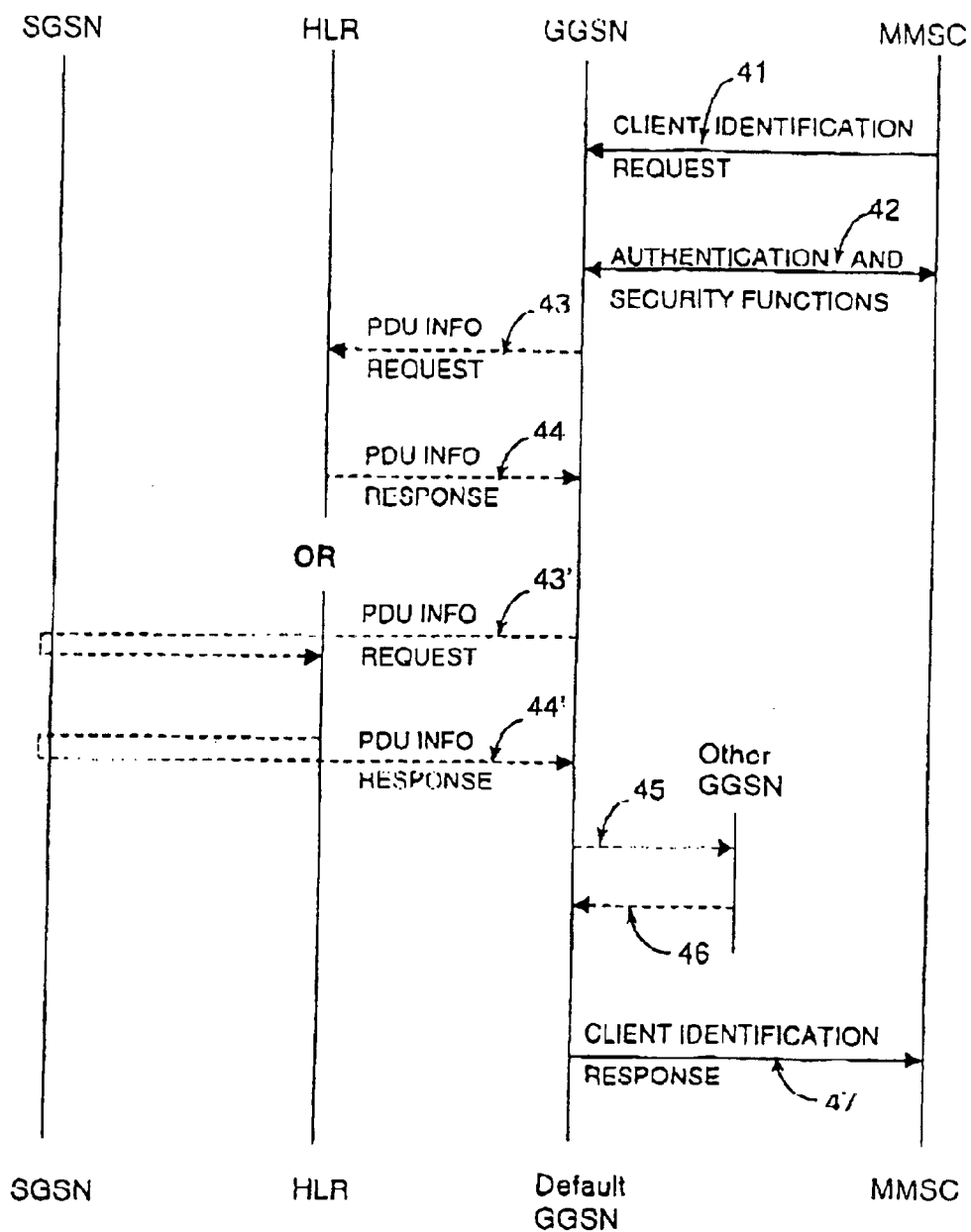
FIG. 4 is a message diagram showing the flow of messages in a method according to the invention.

FIG. 4 shows a message diagram that illustrates the flow of messages between the MMSC and the parts of the GPRS network in a first preferred embodiment of the invention. Having mapped the address of the recipient into an MMS-ID, the MMSC sends an inquiry, in the form of a Client Identification Request message 41, to the default-GGSN to determine the readiness of the wireless terminal to receive data. The MMS-ID is delivered with this message. After this, specific authentication and security functions 42 can be carried out to check that the MMSC in question is authorised to carry out said inquiry. Typically, the Security ID part of the MMS-ID is used here, in such a way that the default-GGSN forms a Security ID on the basis of the MMSC-ID and User ID comprised by the MMS-ID using a specific pre-determined algorithm and compares it to the Security ID (formed by the MMSC) delivered with the MMS-ID. Alternatively, some other security mechanism can be used.

The default-GGSN maps the MMS-ID delivered with the Client Identification Request message 41 to the IMSI code of the wireless terminal to which the MMS-ID in question belongs. The default-GGSN preforms said mapping by inquiring about the IMSI code that corresponds to said MMS-ID from the above-mentioned database, in which the correspondences between the MMS-ID and the IMSI code of the wireless terminal are stored (e.g. from the DNS server).

Next, the default-GGSN, which maintains the PDP-context parameters and fields (e.g. IP address) of wireless terminals, examines whether the wireless terminal having the IMSI code in question has an active PDP-context with the default-GGSN in question. If a PDP-context is active, the default-GGSN knows that the wireless terminal MS is ready to receive data. This being the case, the default-GGSN is also aware of the wireless terminal's IP address, regardless of whether it is statically or dynamically allocated. As a response to the inquiry, the default-GGSN now sends the MMSC a positive Client Identification Response message 47, which indicates that the wireless terminal MS having the MMS-ID in question is ready to receive data. It is possible to indicate the IP address (either dynamic or static) of the wireless terminal that is ready to receive data in said positive Client Identification Response message 47, or just to indicate that the wireless terminal MS having the MMS-ID in question is ready to receive data through the default-GGSN in question.

If the MMSC is logically connected with the GPRS (cellular) network, for example, in the operator's own Intranet network, interface 22 can subsequently be used for transmitting the multimedia message to the default-GGSN (and further to the wireless terminal MS). If the MMSC is located in a packet data network (e.g. in the Internet network) managed by an external service provider, typically, the multimedia message is also sent to the MS through the Internet network, According to the invention, the multimedia message is preferably no longer stored in any network element of the cellular network, but the data packets are delivered uninterrupted to the wireless terminal MS, This advantage is achieved by placing the MMSC outside the cellular network. Transmission of data from the packet data network to the GPRS network is well known to a person skilled in the art.

If the wireless terminal MS does not have an active PDP-context with the default-GGSN, the default-GGSN determines whether the wireless terminal MS has an active PDP-context (an existing data connection) with some other GGSN Preferably, the default-GGSN finds this out by making an inquiry in the form of a PDU Info Request message 43 (PDU=Protocol Data Unit) over the Gc interface to the home location register HLR. Alternatively, if the Gc interface is not implemented in the system, the GGSN can send a PDU Info Request message 43' over the Gn interface to the SGSN and request the SGSN to transfer the message 43' over the Gr interface to the HLR.

Here it should be noted that the PDU Info Request message 43, 43' does not have to be transmitted at all if the wireless terminal MS has an active PDP-context with the default-GGSN, i.e. with the GGSN to which the Client Identification Request message 41 was originally sent from the MMSC. Therefore, the PDU Info Request message 43, 43' and the PDU Info Response message 44, 44' sent in due course as a response, are shown with dashed lines in FIG. 4.

The HLR maintains the GPRS subscriber information of wireless terminals. Among other things, information on the PDP-contexts a wireless terminal having a specific IMSI code is permitted to activate is found in the HLR's "PDP context subscription records" fields. The "PDP context subscription records" fields also comprise an "Access Point Name" field (APN) that indicates, for each IMSI, the Access Points at which a particular wireless terminal MS is permitted to connect to an external packet data network. Here the term external packet data network means the Internet network, for example. On receiving the PDU Info Request message 43, 43', in the next step of the method the HLR checks the logical names of the access points permitted to the IMSI in question from the APN field, on the basis of the IMSI code of the wireless terminal MS in question sent with the PDU Info Request message 43, 43'.

Said logical names of the access points are sent by the HLR to the default-GGSN in a PDU Info Response message 44, 44'. The PDU Info Response message is sent from the HLR to the default-GGSN, either directly through the Gc interface (message 44) or via the SGSN over the Gr and Gn interfaces (message 44'). The access point names indicate the GGSNs, with which the wireless terminal MS can have an active PDP-context, to the default-GGSN. A PDP-context can be activated, for example, with another GGSN of the same GPRS network or with a GGSN of a GPRS network (other PLMN) controlled by another teleoperator, such as $GGSN_2$ (FIG. 2).

In the next step, the default-GGSN to which the original inquiry from the MMSC arrived, determines if any of the GGSNs with which, on the basis of the PDU Info Response message, the wireless terminal MS may have a PDP-context activated, actually has an active context. This investigation is made by sending said GGSNs a message 45 (Other GGSN, FIG. 4), which forwards the IMSI code of the wireless terminal in question and requests each GGSN to examine its own PDP-context fields on the basis of said IMSI code to determine whether the wireless terminal in question has an active PDP-context with the GGSN in question. GGSNs controlled by the same operator are interconnected by the operator's internal IP network (Intra-PLMN Backbone network), whereupon the domain name of each GGSN can be used as the address of the recipient of the investigation message 45. Investigation messages 45 can be sent to the GGSNs of another operator through the Gp interface between different operators, defined in GPRS, or over the Internet via the Gi interface. However, the Gi interface is preferably not used because, for security reasons, there is a desire not to reveal the secret IMSI code of the wireless terminal to network elements external to the GPRS network. Each GGSN to which said message is sent, responds 46 to the default-GGSN that sent the message 45, indicating whether the GGSN in question has an active PDP-context with the wireless terminal MS having the IMSI code in question. In the case where a particular GGSN has an active PDP-context with the wireless terminal MS in question, the response message preferably comprises the PDP address (e.g. IP address) of the wireless terminal in question, particularly if it is of the dynamic type. Said information is apparent from the values of the wireless terminal's PDP-context parameters, maintained by the GGSN in question.

On receiving the responses 46, the default-GGSN sends either a positive or negative Client Identification Response message 47 over interface 22 to the MMSC. A positive Client Identification Response message 47 comprises information that the wireless terminal having the MMS-ID in question is ready to receive data via a specific GGSN. Preferably, the message 47 contains the MMS-ID in question. Said specific GGSN is the GGSN with which the wireless terminal MS has an active PDP-context. If the wireless terminal has active PDP-contexts with more than one GGSN, the addresses of all these GGSNs can be communicated to the MMSC. It is also possible to indicate the PDP address, such as the IP address, of the wireless terminal ready to receive data in said positive Client Identification message 47.

A negative Client Identification Response message 47 comprises information that the wireless terminal having the MMS-ID in question is not ready to receive data, whereupon the MMSC can, for example, send a new inquiry to the default-GGSN to determine the readiness of the wireless terminal MS to receive data, a specific period of time after sending the previous inquiry.

Alternatively, the default-GGSN can check the wireless terminal's readiness to receive data by sending a slightly modified PDU Info Request message 43, 43' to the HLR. In this case, the HLR first looks up the address of the SGSN serving the wireless terminal at that particular moment, from the SGSN Address field maintained in the HLR, and then inquires from the SGSN in question on the basis of the IMSI code of the wireless terminal, over the Gr interface, whether the wireless terminal MS in question has an active PDP-context with some GGSN. The GGSN with which the wireless terminal MS has activated a PDP-context is apparent, e.g. from the value of the "GGSN Address in use" parameter maintained by the SGSN in question. On receiving the information it requested from the SGSN, the HLR further sends a PDU Info Response message 44, 44' to the default-GGSN, as described above. It is also possible that the HLR delivers the address of the SGSN serving the wireless terminal MS to the default-GGSN, after which the default-GGSN inquires about the address of the GGSN with which the wireless terminal MS has an active PDP-context from said SGSN, on the basis of the IMSI code.

According to the invention, a GGSN may also refuse to transfer a message from the MMSC to the wireless terminal. For example, if the wireless terminal's telephone bills have not been paid, the default-GGSN may return a negative Client Identification Response message 47 to the MMSC, in which it is-indicated that multimedia messaging to the wireless terminal MS in question is not permitted. Naturally, in this case, the database which maintains the wireless terminal's invoicing data in the GPRS network must be accessible to the default-GGSN. Typically, said negative Client Identification Response message 47 is also sent in a situation, where the above-mentioned authentication and security functions 42 do not succeed. In this case, execution of the method according to the invention will also be halted in the cellular network before the MMS-ID is mapped to the IMSI.

After receiving a positive Client Identification Response message 47, the MMSC sends the multimedia message as data packets to the GGSN with which the wireless terminal has an active PDP-context. Said GGSN forwards the data packets to the wireless terminal MS.

The MMSC can send the data packets to said GGSN via the default-GGSN or through a packet data network, such as an IP network (e.g. Intranet, Internet). If said GGSN is served by an MMSC different from that which communicated with the default-GGSN, the data packets can alternatively be sent to said GGSN through this second MMSC. IP protocols or other protocols supported by the GPRS network can be used for communication between the MMSC and the wireless terminal MS.

The multimedia message described in connection with the first preferred embodiment of the invention, which the MMSC transfers to the wireless terminal that has subscribed to the multimedia service, may originate from many different sources. It can be, for example, a photograph, fax, home-video clip or voice message sent in electronic format from one wireless terminal to another. It may also contain, for example, an electronic mail message sent from a TCP/IP network to the MMSC, comprising a multimedia component to be transferred to the wireless terminal, or any message comprising multimedia components. Although this description has mainly discussed multimedia messages, the invention is not restricted to a multimedia messaging service, but can be used in any similar messaging service.

Alternatively, a messaging service can be implemented in a pull-type mode. In this case, the messaging server sends the wireless terminal MS a notification message to indicate that a message addressed to the wireless terminal has been stored in its memory. After this, the wireless terminal can decide about retrieving said message from the messaging server to the wireless terminal MS. Said notification message can be transmitted to the wireless terminal MS as a short message (SMS), if it is attached to the GPRS network even if it does not have an active PDP-context activated with any GGSN. If the wireless terminal MS is, however, attached to the GPRS network (MS is in a GPRS attach mode), it is possible for said notification message, for example, to request the wireless terminal MS to activate a PDP-context to enable it to receive messages (e.g. multimedia messages from a messaging server).

According to a second preferred embodiment of the invention, an inquiry is made from the messaging server to determine whether the wireless terminal is attached to the GPRS network (GPRS attach) in order to know whether the wireless terminal can receive said notification message in the form of a short message. This is done after storing the message addressed to the wireless terminal by sending a slightly modified Client Identification Request message 41 from the MMSC to the default GGSN in which the default-GGSN is requested to determine whether the wireless terminal having the MMS-ID in question is attached to the GPRS network.

The default-GGSN maps the MMS-ID to the IMSI of the wireless terminal in question with the aid of the DNS server and checks whether the wireless terminal is attached to the GPRS network by sending a PDU Info Request message 43, 43' to the HLR. In this case, the HLR checks the SGSN Address field it maintains, according to the IMSI in question, to determine whether the SGSN Address field contains the SGSN address. If the SGSN address is found in the field in question said wireless terminal is attached to the GPRS network. If the SGSN Address field is empty said wireless terminal is not attached to the GPRS network.

Having determined whether said wireless terminal MS is attached to the GPRS network, the HLR sends a PDU Info Response message 44, 44' to the default-GGSN, which sends either a positive or negative Client Identification Response message 47 to the MMSC. The positive Client Identification Response message 47 indicates that the wireless terminal having the MMS-ID in question is attached to the GPRS network and is, therefore, ready to receive the notification messages as a short message. The negative Client Identification Response message 47 indicates that said wireless terminal MS is not attached to the GPRS network, in which case it is not yet appropriate to send the notification message.

In addition to a GPRS network, the invention can also be implemented in $3^{rd}$ generation networks, such as in a WCDMA network, because the uppermost protocol levels of such a network correspond to the uppermost protocol levels of a GPRS network. In a $3^{rd}$ generation network, a 3G-GGSN ($3^{rd}$ Generation GGSN) corresponds to the GGSN, a 3G-SGSN corresponds to the SGSN and a 3G-RAN ($3^{rd}$ Generation Radio Access Network) corresponds to the base station system BSS. According to one proposal, in a $3^{rd}$ generation network, an IMUI (International Mobile User Identity) code corresponds terminologically to the IMSI code, and a UIM (User Identification Module) card corresponds to the SIM card.

The invention is also suitable for implementation in a WAP system. In this case, a WAP gateway is situated between the MMSC and the default-GGSN, through which messages travelling between the MMSC and the default-GGSN typically pass transparently.

The invention can be implemented in software by making the required changes to the program code in the GGSN. The functionality of the MMSC can also be implemented programmably. The computer program products in question can be stored in a data medium, for example, in a memory, they can be transferred and they can be executed, for example, in a computer.

Figure 5:
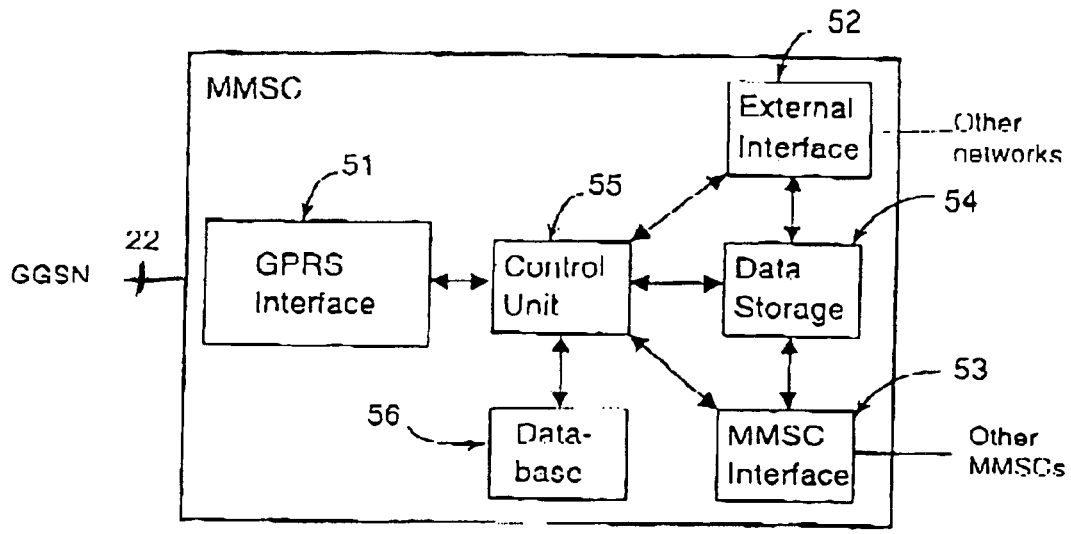
FIG. 5 is a block diagram illustrating functional blocks of an MMSC.

FIG. 5 shows a block diagram illustrating the functional blocks of an MMSC associated with implementation of the present invention. The MMSC comprises a GPRS interface 51 through which the MMSC communicates with a GGSN of a GPRS network. Communication with other external networks, such as the Internet, is managed through an external interface 52 and communication with other multimedia messaging service centres is handled through an MMSC interface 53. Data store 54 is a database in which multimedia messages are stored and kept. A control unit 55 controls the operation of the MMSC. For mapping the plain (RFC822 address) of the recipient of a multimedia message to the correct MMS-ID, the MMSC comprises a database 56, in which the correspondences between the plain addresses in RFC822 format and the MMS-IDs are maintained. Additionally, the MMSC comprises some blocks related to authentication and maintenance of the MMSC (these are not shown in the figure).

According to the invention, multimedia messages addressed to a wireless terminal MS arrive at the MMSC via one of its interfaces (51–53) and are stored in the data store 54. On the basis of the data in database 56, the control unit maps the plain address of the wireless terminal MS (e.g. an address in RFC822 format) into an MMS-ID. The database 56 can be maintained, for example, by a telecommunication network operator or a service provider external to the cellular network. A new MMS-ID can be added to said database 56, for example, as follows: When the owner of a specific wireless terminal MS subscribes to a multimedia messaging service, he/she tells the service provider the addresses of the wireless terminal MS he/she uses (e.g. telephone number, electronic mail-type address). The multimedia messaging service provider then agrees a suitable value for the MMS-ID by which the wireless terminal will be unequivocally identified with the GPRS operator question. Said addresses of the wireless terminal and the corresponding MMS-ID are stored in the database 56 of the MMSC. Correspondingly, the same MMS-ID is stored in a DNS server in the GPRS network under the control of the operator and is associated with the IMSI code that corresponds to the addresses in question. The inquiries (Client Identification Request) sent to the GGSN are preferably generated at the GPRS interface 51 at the command of the control unit 55, and its transmission takes place via the GPRS interface 51. The GPRS interface 51 and the MMSC interface 66 of the GGSN, presented in connection with the description of FIG. 6, together implement the interface 22. The response to the inquiry (Client Identification Response) sent by the GGSN is also received through the GPRS interface 51. The interface (51–53) of the MMSC through which multimedia messages are subsequently transmitted in to the wireless terminal MS may vary depending on the location of the MMSC and the wireless terminal.

Figure 6:
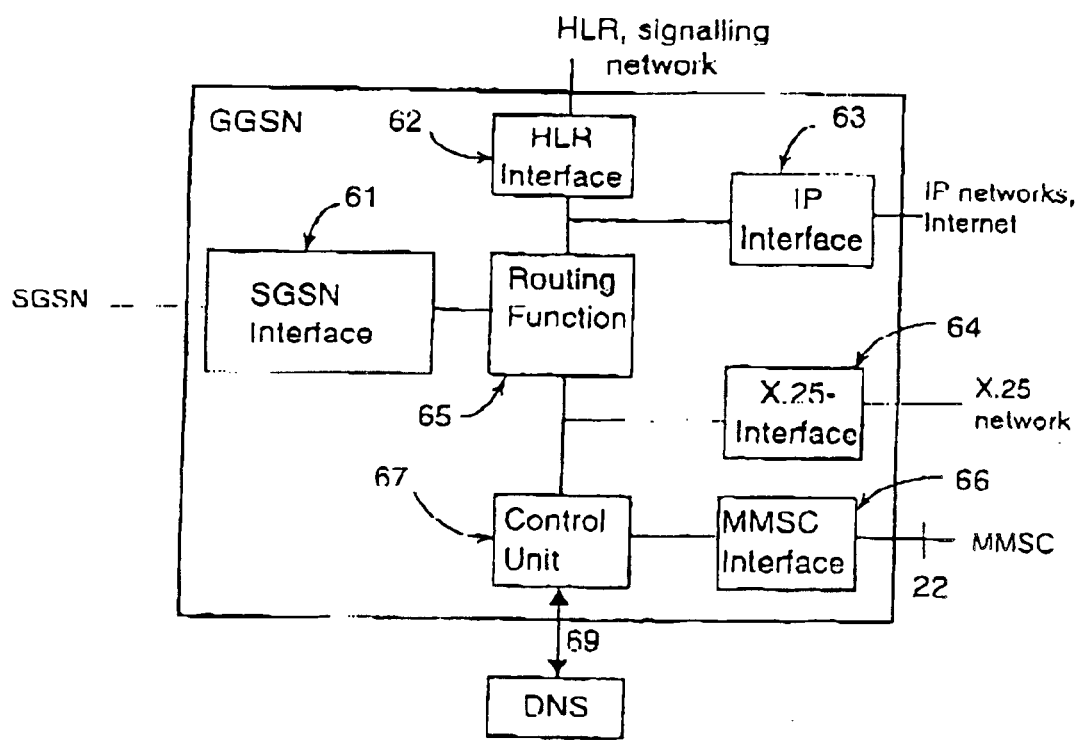
FIG. 6 is a block diagram illustrating functional blocks of a GGSN.

FIG. 6 shows a block diagram illustrating the functional blocks of a GGSN associated with implementation of the present invention. The GGSN comprises an SGSN interface 61 through which the GGSN communicates with the cellular network managed by its own operator (Intra-PLMN Backbone network). The GGSN communicates with an HLR through an HLR interface 62. It is also possible to communicate with other elements of a signalling network (e.g. SS7) through this interface. The GGSN communicates with IP networks (e.g. the Internet) through an IP interface 63 and with an X-25 packet network through an X.25 interface 64. The GGSN transmits messages to the GPRS interface 51 of the MMSC and receives messages from the GPRS interface 51 of the MMSC, in a manner according to the invention, through an MMSC interface 66. The MMSC interface 66 and the GPRS interface 51 of the MMSC together implement the interface 22.

A routing function 65 routes data packets within the network managed by the operator and between the network managed by the operator and other networks. The DNS server is a separate device, typically controlled by the same operator as the GGSN. The GGSN control unit 67, which controls the operation of the GGSN, has a connection 69 to the DNS server. The DNS server contains information on the correspondence of the MMS-IDs and the IMSI codes of wireless terminals. Typically, the control unit 67 maps an MMS-ID arriving from the MMSC with a Client Identification Request message 41 to the correct IMSI code, in a manner according to the invention, by inquiring about the IMSI code the corresponds to said MMS-ID from the DNS server over said connection 69.

According to the present invention, an identifier external to a cellular network is used to identify a wireless terminal MS, such as an MMS-ID, which identifies the wireless terminal MS in question unequivocally, independent of the wireless terminal's address in RFC822 format used at any given time. Thus, the IMSI code used to unequivocally identify the wireless terminal inside the cellular network does not have to be revealed to outside the cellular network, Furthermore, use of an MMS-ID provides the advantage that if the address of the wireless terminal in RFC822 format changes, no changes are required in the cellular network (GPRS network). It is sufficient to update a new RFC822 address in the messaging server to correspond to the MMS-ID of the wireless terminal, which can still be used in communication between the messaging server and the cellular network.

The invention also enables inquiries relating to a wireless terminal to be performed from outside a cellular network in connection with the use of dynamic PDP addresses, because an MMS-ID independent of the dynamic PDP address is used in communication between the messaging server and the cellular network. Said inquiries are, for example, an inquiry to determine the readiness of a wireless terminal to receive data and an inquiry to determine whether a wireless terminal is attached to a GPRS network (i.e. an inquiry determine the readiness to receive a short message).

This description presents the implementation and embodiments of the present invention, with the aid of examples. It will be apparent to a person skilled in the art that the present invention is not restricted to details of the embodiments presented above, and that the invention can also be implemented in another form without deviating from the characteristics of the invention. The embodiments presented above should be considered illustrative, but not restrictive. Thus, the possibilities for implementing and using the invention are only restricted by the accompanying claims. Consequently, the various options for implementing the invention as determined by the claims, including equivalent implementations, also belong to the scope of the invention.

What is claimed is:

1. A method for inquiring about information relating to a wireless terminal of a cellular network, from the cellular network by a messaging server external to the cellular network, wherein the method comprises:

sending an inquiry from the messaging server to the cellular network to determine said information relating to the terminal, the inquiry comprising a first identifying said terminal, the first identifier being a specific identifier external to the cellular network;

mapping said first identifier to a specific second identifier in the cellular network, the second identifier being an internal identifier of the cellular network;

determining said information relating to the terminal with the aid of said second identifier;

sending a response message in response to said inquiry from the cellular network to said messaging server external to the cellular network, in which response message the information relating to said terminal is indicated with the aid of said first identifier.

2. A method according to claim 1, wherein said inquiry is made in response to a message addressed to the terminal arriving at the messaging server.

3. A method according to claim 2, wherein said message is a multimedia message.

4. A method according to claim 1, wherein the transmission of data in the method is performed in a packet switched mode.

5. A method according to claim 2, wherein the method comprises:

mapping an address associated with the message addressed to the terminal to said first identifier of the terminal in the messaging server before sending said inquiry to the cellular network.

6. A method according to claim 1, wherein said second identifier is one of the following: an IMSI (International Mobile Subscriber Identity) code, and IMUI (International Mobile User Identity) code.

7. A method according to claim 1, wherein said inquiry is sent to a specific network element of the cellular network and that said network element determines said information relating to the terminal (MS) using said second identifier.

8. A method according to claim 7, wherein said network element is a gateway GPRS support node and that the inquiry is always sent from the messaging server to the same gateway GPRS support node.

9. A method according to claim 2, wherein said network element is a gateway GPRS support node, and said messaging server receives said response message, in which said information relating to the terminal is indicated, and that said information is one of the following: the readiness of the terminal to receive data, the terminal being attached to the network.

10. A method according to claim 9, wherein said information relating to the terminal is the readiness of the terminal to receive data, whereupon said response message indicates whether said terminal has an active PDP-context (Packet Data Protocol) with a gateway GPRS support node, wherein:

in a situation, where the terminal has an active PDP-context with a gateway GPRS support node, said message is sent from the messaging server to the terminal in response to the receipt of said response message; and in a situation, where the terminal does not have an active PDP-context with any gateway GPRS support node said message is not sent to the terminal.

11. A method according to claim 10, wherein in a situation, where the terminal does not have an active PDP-context with any gateway GPRS support node, said inquiry is repeated after a specific period of time.

12. A method according to claim 1, wherein said first identifier comprises:

a first part that indicates a messaging service subscriber;

a second part that indicates the messaging server in question; and a third part that can be determined on the basis of said first and second parts for the purpose of security.

13. A server external to a cellular network for inquiring about specific information, relating to a terminal of the cellular network, from the cellular network, wherein the server comprises:

means for defining a specific first identifier external to the cellular network for identifying said terminal;

means for sending an inquiry from the server to the cellular network, the inquiry comprising said first identifier to be mapped in the cellular network to a specific second identifier so as to determine said information relating to the terminal with the aid of said second identifier, and wherein said second identifier is an internal identifier of the cellular network; and means for receiving a response message sent from the cellular network in response to said inquiry, the response message comprising said determined information relating to said terminal, indicated with the aid of said first identifier.

14. A server according to claim 13, wherein the server is arranged to send said inquiry in response to a message addressed to the terminal arriving at the server; and that the server comprises:

means for mapping the address, associated with the message addressed to the terminal, to said first identifier of the terminal.

15. A computer program product executable in a server external to a cellular network for inquiring about specific information, relating to a terminal of the cellular network, from the cellular network, wherein the computer program product comprises:

program code for defining a first identifier external to the cellular network for identifying said terminal;

program code for causing said server to send an inquiry to the cellular network, the inquiry comprising said first identifier to be mapped in the cellular network to a specific second identifier so as to determine said information relating to the terminal with the aid of said second identifier, and wherein said second identifier is an internal identifier of the cellular network; and program code for causing said server to receive a response message sent from the cellular network in response to said inquiry, the response message comprising said determined information relating to said terminal, indicated with the aid of said first identifier.

16. A network element of a cellular network, wherein it comprises;

means for receiving an inquiry sent by a server external to the cellular network, the inquiry comprising a request to determine specific information relating to a terminal of the cellular network, and the inquiry comprising a first identifier for identifying said terminal, the first identifier being a specific identifier external to the cellular network;

means for mapping said first identifier to a specific second identifier, the second identifier being an internal identifier of the cellular network;

means for determining said information relating to the terminal with the aid of said second identifier;

means for sending a response message to the server external to the cellular network in response to said inquiry, the response message comprising the information relating to said terminal indicated with the aid of said first identifier.

17. A network element according to claim 16, wherein said network element is a gateway support node of the cellular network.

18. A computer program executable in a network element of a cellular network, wherein the computer program product comprises program code:

for causing the network element to receive an inquiry sent by a specific server external to the cellular network, the inquiry comprising a request to determine specific information relating to a terminal of the cellular network, and the inquiry comprising a first identifier for identifying said terminal, the first identifier being a specific identifier external to the cellular network;

for mapping said first identifier to a specific second identifier, the second identifier being an internal identifier of the cellular network;

for causing the network element to determine said information relating to the terminal with the aid of said second identifier;

for causing the network element to send a response message to the server external to the cellular network in response to said inquiry, the response message comprising the information relating to said terminal indicated with the aid of said first identifier.

19. A system comprising a server external to a cellular network and a network element of the cellular network for inquiring about information, relating to a terminal of the cellular network from the cellular network from the server external to the cellular network, wherein the server comprises:

means for defining a specific first identifier external to the cellular network for identifying said terminal;

means for sending an inquiry from the server to the network element of the cellular network to determine said information relating to the terminal, the inquiry comprising said first identifier and that the network element of the cellular network comprises:

means for receiving said inquiry;

means for mapping said first identifier to a specific second identifier, the second identifier being an internal identifier of the cellular network;

means for determining said information relating to the terminal with the aid of said second identifier;

means for sending a response to the server external to the cellular network in response to said inquiry, the response message comprising the information relating to said terminal indicated with the aid of said first identifier.

\* \* \* \* \*

UNITED STATES PATENT AND TRADEMARK OFFICE
CERTIFICATE OF CORRECTION

| | | |
|---|---|---|
| PATENT NO. | : 6,885,870 B2 | Page 1 of 1 |
| APPLICATION NO. | : 09/745756 | |
| DATED | : April 26, 2005 | |
| INVENTOR(S) | : Outi Aho | |

It is certified that error appears in the above-identified patent and that said Letters Patent is hereby corrected as shown below:

On the cover page, "Field" item (22):
    replace "Feb. 22, 2001" with --Dec. 21, 2000--

On the cover page of the EX PARTE REEXAMINATION CERTIFICATE (8597th),
opposite the word "Filed" under the "Reexamination Certificate for" section:
    replace "Feb. 22, 2001" with --Dec. 21, 2000--

Signed and Sealed this
Thirteenth Day of March, 2012

David J. Kappos
*Director of the United States Patent and Trademark Office*

US006885870C1

(12) EX PARTE REEXAMINATION CERTIFICATE (8597th)
United States Patent
Aho

(10) Number: US 6,885,870 C1
(45) Certificate Issued: Oct. 4, 2011

(54) TRANSFERRING OF A MESSAGE

(75) Inventor: Outi Aho, Lempäälä (FI)

(73) Assignee: Comcast Cable Communications, LLC, Philadelphia, PA (US)

Reexamination Request:
No. 90/011,318, Dec. 14, 2010

Reexamination Certificate for:
Patent No.: 6,885,870
Issued: Apr. 26, 2005
Appl. No.: 09/745,756
Filed: Feb. 22, 2001

(51) Int. Cl.
*H04Q 7/22* (2006.01)

(52) U.S. Cl. .................. 455/466; 455/432.1; 455/432.3; 370/353; 370/395.1
(58) Field of Classification Search .................. None
See application file for complete search history.

(56) References Cited

U.S. PATENT DOCUMENTS

| 6,717,928 B1 | 4/2004 | Kalliokulju |
| 6,728,208 B1 | 4/2004 | Puuskari |
| 7,127,489 B2 | 10/2006 | Aho |

FOREIGN PATENT DOCUMENTS

| KR | 19990060754 A | 7/1999 |
| WO | 98/19438 | 5/1998 |
| WO | 99/66746 | 12/1999 |
| WO | 00/56088 | 9/2000 |
| WO | 00/64203 | 10/2000 |

OTHER PUBLICATIONS

Sevanto, Jarkko, "Multimedia Messaging Service for GPRS and UMTS," IEEE Wireless Communications and Networking Conference, IEEE WCNC 1999, pp. 1422–1426.
Wireless Application Protocol Push Architectural Overview, version Nov. 8, 1999, Wireless Application Protocol Forum, Ltd. (Nov. 8, 1999).
Wireless Application Protocol Push Proxy Gateway Service Specification, version Aug. 16, 1999, Wireless Application Protocol Forum, Ltd. (Aug. 16, 1999).
Wireless Application Protocol Push Access Protocol Specification, version Nov. 8, 1999, Wireless Application Protocol Forum, Ltd. (Nov. 8, 1999).
Wireless Application Protocol Push Message Specification, version Aug. 16, 1999, Wireless Application Protocol Forum, Ltd. (Aug. 16, 1999).
Wireless Application Protocol Push OTA Protocol Specification, version Nov. 8, 1999, Wireless Application Protocol Forum, Ltd. (Nov. 8, 1999).
Wireless Application Group User Agent Profile Specification, version Nov. 10, 1999, Wireless Application Protocol Forum, Ltd. (Nov. 10, 1999).
Wireless Application Protocol Wireless Application Environment Overview, version Nov. 4, 1999, Wireless Application Protocol Forum, Ltd. (Nov. 4, 1999).
Wireless Application Protocol Wireless Application Environment Specification Version 1.2, version Nov. 4, 1999, Wireless Application Protocol Forum, Ltd. (Nov. 4, 1999).
Wireless Application Protocol Architecture Specification, version Apr. 30, 1998, Wireless Application Protocol Forum, Ltd. (Apr. 30, 1998).

(Continued)

*Primary Examiner*—Roland Foster

(57) ABSTRACT

A method is provided for inquiring about information relating to a mobile terminal of a cellular network, from a messaging server external to the cellular network. An inquiry is sent from the messaging server to the cellular network, comprising an external first identifier for identifying said terminal. In the cellular network the first identifier is mapped to a second internal identifier. The information relating to the terminal (MS) is determined with the aid of said second identifier and a responsive message is sent from the cellular network to said messaging server. In the response message, said information relating to the terminal is indicated by the first identifier.

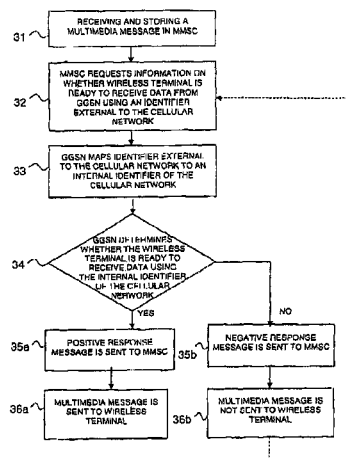

OTHER PUBLICATIONS

Wireless Application Protocol WAP over GSM USSD Specification, version Jul. 15, 1999, Wireless Application Protocol Forum, Ltd. (Jul. 15, 1999).

Wireless Application Protocol Binary XML Content Format Specification Version 1.2, version Nov. 4, 1999, Wireless Application Protocol Forum, Ltd. (Nov. 4, 1999).

Wireless Application Protocol Wireless Control Message Protocol Specification, version Aug. 4, 1999, Wireless Application Protocol Forum, Ltd. (Aug. 4, 1999).

Wireless Application Protocol Wireless Datagram Protocol Specification, version Nov. 5, 1999, Wireless Application Protocol Forum, Ltd. (Nov. 5, 1999).

Wireless Application Protocol WDP and WCMP Adaptation for access of a WAP Proxy Server to a Wireless Data Gateway, Wireless Application Protocol Forum, Ltd. (Nov. 5, 1999).

Wireless Application Protocol Identity Module Specification Part: Security, version Nov. 5, 1999, Wireless Application Protocol Forum, Ltd. (Nov. 5, 1999).

Wireless Application Protocol Wireless Markup Language Specification Version 1.2, version Nov. 4, 1999, Wireless Application Protocol Forum, Ltd. (Nov. 4, 1999).

Wireless Application Protocol WMLScript Language Specification Version 1.1, approved version Nov. 4, 1999, Wireless Application Protocol Forum, Ltd. (Nov. 4, 1999).

Wireless Application Protocol WMLScript Statement of Intent, version Apr. 30, 1998, Wireless Application Protocol Forum, Ltd. (Apr. 30, 1998).

Wireless Application Protocol WMLScript Standard Libraries Specification Version 1.1, approved version Nov. 4, 1999, Wireless Application Protocol Forum, Ltd. (Nov. 4, 1999).

Wireless Application Protocol Wireless Session Protocol Specification, version Nov. 5, 1999, Wireless Application Protocol Forum, Ltd. (Nov. 5, 1999).

Wireless Application Protocol Wireless Transport Layer Security Specification, version Nov. 5, 1999, Wireless Application Protocol Forum, Ltd. (Nov. 5, 1999).

Wireless Application Protocol Wireless Transaction Protocol Specification, version Jun. 11, 1999, Wireless Application Protocol Forum, Ltd. (Jun. 11, 1999).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13-15 and 18-19 is confirmed.

Claims 1 and 16 are determined to be patentable as amended.

Claims 2-12 and 17, dependent on an amended claim, are determined to be patentable.

New claims 20-113 are added and determined to be patentable.

1. A method for inquiring about information relating to a wireless terminal of a cellular network, from the cellular network by a messaging server external to the cellular network, wherein the method comprises:
   sending an inquiry from the messaging server to the cellular network to determine said information relating to the terminal, the inquiry comprising a first *identifier* identifying said terminal, the first identifier being a specific identifier external to the cellular network;
   mapping said first identifier to a specific second identifier in the cellular network, the second identifier being an internal identifier of the cellular network;
   determining said information relating to the terminal with the aid of said second identifier;
   sending a response message in response to said inquiry from the cellular network to said messaging server external to the cellular network, in which response message the information relating to said terminal is indicated with the aid of said first identifier.

16. A network element of a cellular network, wherein it comprises[:]*:*
   means for receiving an inquiry sent by a server external to the cellular network, the inquiry comprising a request to determine specific information relating to a terminal of the cellular network, and the inquiry comprising a first identifier for identifying said terminal, the first identifier being a specific identifier external to the cellular network;
   means for mapping said first identifier to a specific second identifier, the second identifier being an internal identifier of the cellular network;
   means for determining said information relating to the terminal with the aid of said second identifier;
   means for sending a response message to the server external to the cellular network in response to said inquiry, the response message comprising the information relating to said terminal indicated with the aid of the said first identifier.

20. *A server according to claim 13, wherein the server is configured to send the inquiry to a gateway element of the cellular network.*

21. *A server according to claim 20, wherein the gateway element is a 3G-GGSN.*

22. *A server according to claim 13, wherein the server is configured to send the inquiry to, and to receive the response message from, the same element of the cellular network.*

23. *A server according to claim 13, wherein the information relating to the terminal comprises the readiness of the terminal to receive data.*

24. *A server according to claim 13, wherein the server is configured to repeat the inquiry as a result of a response message indicating the terminal is not ready to receive data.*

25. *A server according to claim 13, wherein said first identifier comprises:*
   *a first part that indicates a messaging service subscriber; and*
   *a second part that indicates the server.*

26. *A server according to claim 13, wherein the information relating to the terminal comprises the readiness of the terminal to receive a notification message indicating that a message addressed to the terminal has been stored.*

27. *A server according to claim 13, wherein the server is configured to send a notification message to the terminal requesting that the terminal become able to receive multimedia messages.*

28. *A computer program product according to claim 15, wherein the program code for causing said server to send an inquiry to the cellular network comprises program code for causing said server to send an inquiry to a gateway element of the cellular network.*

29. *A computer program product according to claim 28, wherein the gateway element is a 3G-GGSN.*

30. *A computer program product according to claim 15, wherein the program code for causing said server to send an inquiry to the cellular network comprises program code for causing said server to send an inquiry to a first element of the cellular network, and wherein program code for causing said server to receive a response message comprises program code for causing said server to receive the response message from the first element of the cellular network.*

31. *A computer program product according to claim 15, wherein the information relating to the terminal comprises the readiness of the terminal to receive data.*

32. *A computer program product according to claim 15, further comprising program code for repeating the inquiry as a result of a response message indicating the terminal is not ready to receive data.*

33. *A computer program product according to claim 15, wherein said first identifier comprises:*
   *a first part that indicates a messaging service subscriber; and*
   *a second part that indicates the server.*

34. *A computer program product according to claim 15, wherein the information relating to the terminal comprises the readiness of the terminal to receive a notification message indicating that a message addressed to the terminal has been stored.*

35. *A computer program product according to claim 15, further comprising program code for sending a notification message to the terminal requesting that the terminal become able to receive multimedia messages.*

36. *A network element according to claim 16, wherein said second identifier is one of the following: an IMSI (International Mobile Subscriber Identity) code, and IMUI (International Mobile User Identity) code.*

37. *A network element according to claim 16, wherein the network element is a 3G-GGSN.*

38. *A network element according to claim 16, wherein the information relating to a terminal comprises information regarding whether the terminal is attached to the cellular network.*

39. A network element according to claim 16, wherein the information relating to the terminal comprises the readiness of the terminal to receive data.

40. A network element according to claim 16, wherein the network element is a gateway element of the cellular network.

41. A network element according to claim 16, wherein the means for mapping are configured to map the first identifier to the second identifier by consulting a second element.

42. A network element according to claim 41, wherein said first identifier comprises:
a first part that indicates a messaging service subscriber; and
a second part that indicates the server.

43. A network element according to claim 41, wherein the second element is a Domain Name Server.

44. A network element according to claim 41, wherein the second element is a Home Location Register.

45. A network element according to claim 16, wherein the response message does not include an IP address of the terminal.

46. A network element according to claim 16, wherein the response message includes an IP address of the terminal.

47. A network element according to claim 16, wherein the means for determining are configured to determine the readiness of the terminal to receive data via the network element.

48. A network element according to claim 47, wherein the means for determining are configured to determine, as a result of determining the terminal is not ready to receive data via the network element, whether the terminal is ready to receive data via another element.

49. The network element of claim 48, wherein the means for determining are configured to obtain, after determining the terminal is not ready to receive data via the network element and before determining whether the terminal is ready to receive data via another element, a list of nodes in the cellular network to which the terminal can connect.

50. The network element of claim 16, wherein the network element is configured to obtain an IP address of the terminal.

51. The network element of claim 16, wherein the response message comprises an address of a second element of the cellular network and an indication that the terminal is ready to receive data via the second element.

52. The network element of claim 16, wherein the means for determining are configured consult a second element for information regarding whether the terminal is ready to receive data.

53. The network element of claim 52, wherein the means for determining are configured to receive an identification of the second element by sending an information request message to a third element.

54. A network element of claim 16, wherein the cellular network includes the network element, a second element, a third element and a fourth element, and wherein
the means for determining are configured to send a first cellular network message to the second element,
the second element is configured to send, as a result of the first cellular network message, a second cellular network message to the third element,
the third element is configured to send a third cellular network message to the second element as a result of the second cellular network message, the third cellular network message identifying the fourth element,
the second element is configured to send a fourth cellular network message to the network element as a result of the third cellular network message, the fourth cellular network message comprising information identifying the fourth element, and
the response message includes information identifying the fourth element.

55. A network element of claim 16, wherein the cellular network includes the network element, a second element, a third element and a fourth element, and wherein
the means for determining are configured to send a first cellular network message to the second element,
the second element is configured to send a second cellular network message to the network element as a result of the first cellular network message, the second cellular network message comprising information identifying the third element,
the network element is configured to send a third cellular network message to the third element as a result of the second cellular network message,
the third element is configured to send a fourth cellular network message to the network element as a result of the third cellular network message, the fourth cellular network message comprising information identifying the fourth element, and
the response message includes information identifying the fourth element.

56. A network element of claim 16, wherein the response message indicates that multimedia messaging to the terminal is not permitted.

57. The network element of claim 56, wherein the network element is configured to determine, prior to sending the response message, that bills associated with the terminal have not been paid.

58. A network element according to claim 16, wherein the information relating to the terminal comprises the readiness of the terminal to receive a notification message indicating that a message addressed to the terminal has been stored.

59. A computer program product according to claim 18, wherein said second identifier is one of the following: an IMSI (International Mobile Subscriber Identity) code, and IMUI (International Mobile User Identity) code.

60. A computer program product according to claim 18, wherein the network element is a 3G-GGSN.

61. A computer program product according to claim 18, wherein the information relating to a terminal comprises information regarding whether the terminal is attached to the cellular network.

62. A computer program product according to claim 18, wherein the information relating to the terminal comprises the readiness of the terminal to receive data.

63. A computer program product according to claim 18, wherein the network element is a gateway element of the cellular network.

64. A computer program product according to claim 18, further comprising program code for causing the network element to map the first identifier to the second identifier by consulting a second element.

65. A computer program product according to claim 64, wherein said first identifier comprises:
a first part that indicates a messaging service subscriber; and
a second part that indicates the server.

66. A computer program product according to claim 64, wherein the second element is a Domain Name Server.

67. A computer program product according to claim 64, wherein the second element is a Home Location Register.

68. A computer program product according to claim 18, wherein the response message does not include an IP address of the terminal.

69. A computer program product according to claim 18, wherein the response message includes an IP address of the terminal.

70. A computer program product according to claim 18, comprising further program code for causing the network element to determine said information by determining the readiness of the terminal to receive data via the network element.

71. A computer program product according to claim 70, comprising further program code for causing the network element to determine, as a result of determining the terminal is not ready to receive data via the network element, whether the terminal is ready to receive data via another element.

72. A computer program product according to claim 71, comprising further program code for causing the network element to obtain, after determining the terminal is not ready to receive data via the network element and before determining whether the terminal is ready to receive data via another element, a list of nodes in the cellular network to which the terminal can connect.

73. A computer program product according to claim 18, comprising further program code for causing the network element to obtain an IP address of the terminal.

74. A computer program product according to claim 18, wherein the response message comprises an address of a second element of the cellular network and an indication that the terminal is ready to receive data via the second element.

75. A computer program product according to claim 18, comprising further program code for causing the network element to consult a second element for information regarding whether the terminal is ready to receive data.

76. A computer program product according to claim 75, comprising further program code for causing the network element to receive an identification of the second element by sending an information request message to a third element.

77. A computer program product according to claim 18, wherein the response message indicates that multimedia messaging to the terminal is not permitted.

78. A computer program product according to claim 77, comprising further program code for causing the network element to determine, prior to sending the response message, that bills associated with the terminal have not been paid.

79. A computer program product according to claim 18, wherein the information relating to the terminal comprises the readiness of the terminal to receive a notification message indicating that a message addressed to the terminal has been stored.

80. A system according to claim 19, wherein the server is configured to repeat the inquiry as a result of a response message indicating the terminal is not ready to receive data.

81. A system according to claim 19, wherein said first identifier comprises:
a first part that indicates a messaging service subscriber; and
a second part that indicates the server.

82. A system according to claim 19, wherein the server is configured to
send the inquiry to network element, and
receive in the response an address of a second element of the cellular network and an indication that the terminal is ready to receive data via the second element.

83. A system according to claim 19, wherein the server is configured to send a notification message to the terminal requesting that the terminal become able to receive multimedia messages.

84. A system according to claim 19, wherein said second identifier is one of the following: an IMSI (International Mobile Subscriber Identity) code, and IMUI (International Mobile User Identity) code.

85. A system according to claim 19, wherein the network element is a 3G-GGSN.

86. A system according to claim 19, wherein the information relating to a terminal comprises information regarding whether the terminal is attached to the cellular network.

87. A system according to claim 19, wherein the information relating to the terminal comprises the readiness of the terminal to receive data.

88. A system according to claim 19, wherein the network element is a gateway element of the cellular network.

89. A system according to claim 19, wherein the means for mapping are configured to map the first identifier to the second identifier by consulting a second element.

90. A system according to claim 89, wherein said first identifier comprises:
a first part that indicates a messaging service subscriber; and
a second part that indicates the server.

91. A system according to claim 89, wherein the second element is a Domain Name Server.

92. A system according to claim 89, wherein the second element is a Home Location Register.

93. A system according to claim 19, wherein the response message does not include an IP address of the terminal.

94. A system according to claim 19, wherein the response message includes an IP address of the terminal.

95. A system according to claim 19, wherein the means for determining are configured to determine the readiness of the terminal to receive data via the network element.

96. A system according to claim 95, wherein the means for determining are configured to determine, as a result of determining the terminal is not ready to receive data via the network element, whether the terminal is ready to receive data via another element.

97. A system according to claim 96, wherein the means for determining are configured to obtain, after determining the terminal is not ready to receive data via the network element and before determining whether the terminal is ready to receive data via another element, a list of nodes in the cellular network to which the terminal can connect.

98. A system according to claim 19, wherein the network element is configured to obtain an IP address of the terminal.

99. A system according to claim 19, wherein the response message comprises an address of a second element of the cellular network and an indication that the terminal is ready to receive data via the second element.

100. A system according to claim 19, wherein the means for determining are configured consult a second element for information regarding whether the terminal is ready to receive data.

101. A system according to claim 100, wherein the means for determining are configured to receive an identification of the second element by sending an information request message to a third element.

102. A system according to claim 19, wherein the cellular network includes the network element, a second element, a third element and a fourth element, and wherein
the means for determining are configured to send a first cellular network message to the second element,
the second element is configured to send, as a result of the first cellular network message, a second cellular network message to the third element, the third element is configured to send a third cellular network message to the second element as a result of the second cellular network message, the third cellular network message identifying the fourth element, the second element is configured to send a fourth cellular network message to the network element as a result of the third cellular network message, the fourth cellular network message comprising information identifying the fourth element, and the response message includes information identifying the fourth element.

103. A system according to claim 19, wherein the cellular network includes the network element, a second element, a third element and a fourth element, and wherein the means for determining are configured to send a first cellular network message to the second element, the second element is configured to send a second cellular network message to the network element as a result of the first cellular network message, the second cellular network message comprising information identifying the third element, the network element is configured to send a third cellular network message to the third element as a result of the second cellular network message, the third element is configured to send a fourth cellular network message to the network element as a result of the third cellular network message, the fourth cellular network message comprising information identifying the fourth element, and the response message includes information identifying the fourth element.

104. A system according to claim 19, wherein the response message indicates that multimedia messaging to the terminal is not permitted.

105. A system according to claim 104, wherein the network element is configured to determine, prior to sending the response message, that bills associated with the terminal have not been paid.

106. A system according to claim 19, wherein the information relating to the terminal comprises the readiness of the terminal to receive a notification message indicating that a message addressed to the terminal has been stored.

107. A server external to a cellular network for inquiring about specific information, relating to a terminal of the cellular network, from the cellular network, wherein the server comprises:

means for defining a specific first identifier external to the cellular network for identifying said terminal;

means for sending an inquiry from the server to the cellular network, the inquiry comprising said first identifier to be mapped in the cellular network to a specific second identifier so as to determine said information relating to the terminal with the aid of said second identifier, and wherein said second identifier is an internal identifier of the cellular network; and means for receiving a response message sent from the cellular network in response to said inquiry, the response message comprising said determined information relating to said terminal, indicated with the aid of said first identifier, and wherein the server is configured to send the inquiry to a first element of the cellular network, and receive in the response an address of a second element of the cellular network and an indication that the terminal is ready to receive data via the second element.

108. A computer program product executable in a server external to a cellular network for inquiring about specific information, relating to a terminal of the cellular network, from the cellular network, wherein the computer program product comprises:

program code for defining a first identifier external to the cellular network for identifying said terminal;

program code for causing said server to send an inquiry to the cellular network by causing said server to send an inquiry to a first element of the cellular network, the inquiry comprising said first identifier to be mapped in the cellular network to a specific second identifier so as to determine said information relating to the terminal with the aid of said second identifier, and wherein said second identifier is an internal identifier of the cellular network;

program code for causing said server to receive a response message sent from the cellular network in response to said inquiry, the response message comprising said determined information relating to said terminal, indicated with the aid of said first identifier; and program code for receiving in the response an address of a second element of the cellular network and an indication that the terminal is ready to receive data via the second element.

109. A network element of a cellular network, comprising:

means for receiving an inquiry sent by a server external to the cellular network, the inquiry comprising a request to determine specific information relating to a terminal of the cellular network, and the inquiry comprising a first identifier for identifying said terminal, the first identifier being a specific identifier external to the cellular network;

means for mapping said first identifier to a specific second identifier, the second identifier being an internal identifier of the cellular network;

means for determining said information relating to the terminal with the aid of said second identifier; and means for sending a response message to the server external to the cellular network in response to said inquiry, the response message comprising the information relating to said terminal indicated with the aid of said first identifier, and wherein the network element is configured to not reveal the second identifier to the server.

110. A computer program executable in a network element of a cellular network, wherein the computer program product comprises program code:

for causing the network element to receive an inquiry sent by a specific server external to the cellular network, the inquiry comprising a request to determine specific information relating to a terminal of the cellular network, and the inquiry comprising a first identifier for identifying said terminal, the first identifier being a specific identifier external to the cellular network;

for mapping said first identifier to a specific second identifier, the second identifier being an internal identifier of the cellular network;

for causing the network element to determine said information relating to the terminal with the aid of said second identifier;

for causing the network element to send a response message to the server external to the cellular network in response to said inquiry, the response message comprising the information relating to said terminal indicated with the aid of said first identifier; and for causing the network element to not reveal the second identifier to the server.

111. A system comprising a server external to a cellular network and a network element of the cellular network for inquiring about information, relating to a terminal of the cellular network from the cellular network from the server external to the cellular network, wherein the server comprises:

means for defining a specific first identifier external to the cellular network for identifying said terminal;

means for sending an inquiry from the server to the network element of the cellular network to determine said information relating to the terminal, the inquiry comprising said first identifier and that the network element of the cellular network comprises:

means for receiving said inquiry;

means for mapping said first identifier to a specific second identifier, the second identifier being an internal identifier of the cellular network;

means for determining said information relating to the terminal with the aid of said second identifier; and means for sending a response to the server external to the cellular network in response to said inquiry, the response message comprising the information relating to said terminal indicated with the aid of said first identifier, and wherein the network element is configured to not reveal the second identifier to the server.

112. A method for inquiring about information relating to a wireless terminal of a cellular network, from the cellular network by a messaging server external to the cellular network, wherein the method comprises:

sending an inquiry from the messaging server to the cellular network to determine said information relating to the terminal, the inquiry comprising a first identifier identifying said terminal, the first identifier being a specific identifier external to the cellular network;

mapping said first identifier to a specific second identifier in the cellular network, the second identifier being an internal identifier of the cellular network, wherein the mapping is not performed by a Home Location Register;

determining said information relating to the terminal with the aid of said second identifier; and sending a response message in response to said inquiry from the cellular network to said messaging server external to the cellular network, in which response message the information relating to said terminal is indicated with the aid of said first identifier.

113. The method of claim 112, wherein the inquiry is sent to, and the determining is performed by, the same element of the cellular network.

\* \* \* \* \*